April 16, 1929. M. DAVIDSON Re. 17,268
LADY'S HAT
Original Filed March 15, 1927
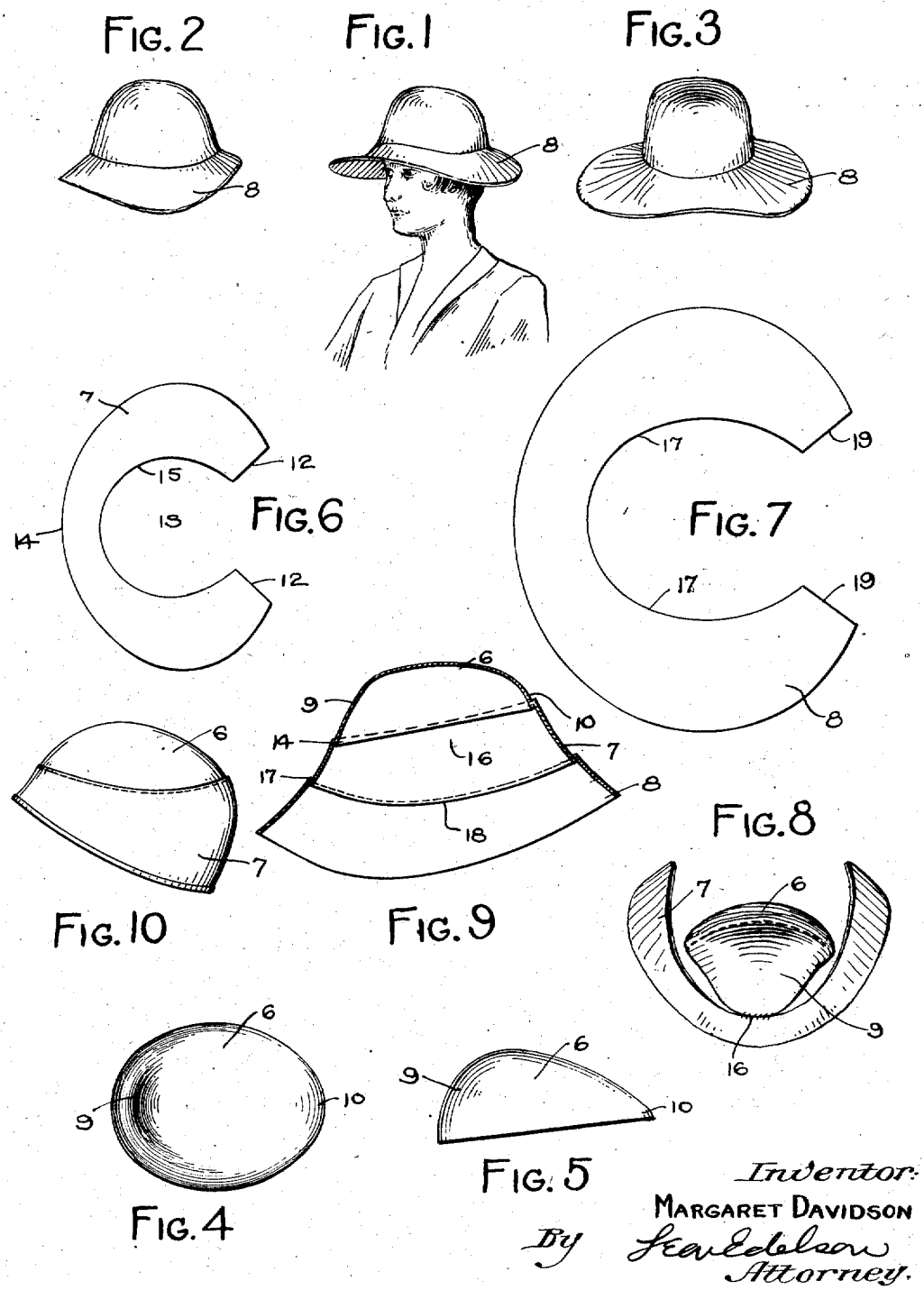
Inventor:
MARGARET DAVIDSON
By Lee Edelson
Attorney.

Reissued Apr. 16, 1929. Re. 17,268

UNITED STATES PATENT OFFICE.

MARGARET DAVIDSON, OF PHILADELPHIA, PENNSYLVANIA.

LADY'S HAT.

Original No. 1,667,415, dated April 24, 1928, Serial No. 175,465, filed March 15, 1927. Application for reissue filed November 7, 1928. Serial No. 317,716.

My invention relates to ladies' hats and more particularly to the foundation structure of same. According to the usual method of making ladies' hats, no provision is made for supporting the back of the brim to prevent same from drooping down over the neck and shoulders of the wearer. In addition to this, considerable difficulty has been experienced in obtaining hats of neat appearance and good fit not only by the milliner who fashions hats according to individual requirement but also by the manufacturer who fabricates hats in wholesale quantities and not according to individual measurements. The problem of the milliner who fashions hats according to an individual's order and that of the manufacturer who fabricates hats in quantities and according to a general pattern are entirely different, yet by means of this invention I provide a method of fabricating hats which is useful to both and by means of which hats of better appearance and fit may be fabricated in a more expeditious manner than has been possible heretofore.

It is accordingly among the primary objects of this invention to provide a set of pattern pieces, preferably of a material such as buckram or the like, by means of which the manufacturer may produce a quantity of ready-to-wear hats, or by which the milliner may fashion a hat according to the requirements or taste of an individual. In either event, these pattern pieces have been reduced to a minimum number, viz, in the so-called "turban" there are employed merely a crown piece and a foundation piece while in the "picture" hat there is employed an additional brim piece.

The set of pattern pieces constructed in accordance with this invention is characterized by the fact that the crown piece thereof is always of such shape and contour as to effectually preclude all tendency for the foundation piece and the brim piece (when the latter is used) to droop down upon the neck and shoulders of the wearer, at the same time that it is designed to provide adequate room for the head of the wearer where such room is most needed.

These objects, and other advantageous ends which will be described hereinafter, I attain in the following manner, reference being had to the accompanying drawings in which Figure 1 is a perspective view of a hat embodying my invention shown as it would appear upon the head of a wearer;

Figure 2 is a side view of the hat shown in Figure 1;

Figure 3 is a front view thereof;

Figures 4 and 5 are top and side views, respectively, of the crown piece of the master pattern set;

Figures 6 and 7 are plan views, respectively, of the foundation and brim pieces of the pattern set;

Figure 8 is a perspective view of the crown piece to which is shown partially attached the foundation piece shown in Figure 6;

Figure 9 is a central longitudinal sectional view of a hat frame embodying the said crown, foundation and brim pieces; and Figure 10 is a perspective view of a hat frame wherein only the crown and foundation pieces are utilized to form a "turban" type of hat.

Referring now more in detail to the drawings, the hat frame as preliminarily constructed consists of a crown piece 6 to which is attached a foundation piece 7 supporting the brim piece 8. In the case of a milliner who is commissioned to fashion a hat to order, the hat frame shown in Figure 9 would be built up on the wearer's head in order to obtain the proper shape, fit and appearance. By changing the relative proportions and curvature of the several pieces of this hat frame the style of the hat may be varied at will and within wide limits. Having ascertained the proper shape of each piece and their relation to each other, the several pieces are permanently secured together in this relation whereby to form the completed hat frame, the latter being then covered with suitable material to complete the hat.

Returning now to a description of the several parts of the pattern set, it will be seen that crown 6, as shown in Figures 4 and 5, is oval in form and broader and deeper at the front end 9 than at the rear end 10, said rear end being only turned downwardly enough to provide a downwardly extending edge to which the upper rear part of the foundation piece 7 may be secured. As clearly appears in Figures 4 and 9 the depending edge of the crown piece is designed to lie in a substantially flat plane inclined rearwardly and upwardly. This shape of the crown piece at the rear, by being shallow and lower than the front, provides a construction whereby the back of the hat is supported and prevented from dropping backwardly on the neck and shoulders. At the same time and by reason of the fact that the depending side edges of the crown piece are disposed in a substantially flat plane inclined upwardly from front to rear there is provided ample space in the interior of the front of the crown for the wearer's hair, this being most clearly shown in Figures 1, 2 and 9.

The outline of foundation piece 7 is very nearly elliptical with a large V-shaped cut 12 made in the rear portion thereof and an aperture 13, of an arcuate outline, formed in its center. Crown piece 6 is shaped over a block and the front edge 14 of foundation piece 7 is secured to the lower edge of front part 9. Side edges 15 are then carried around the outside of crown piece 6, and secured thereto to form the seam 16.

The inner edge 17 of brim piece 8 is then secured to the lower edge 18 of foundation 7 which will cause the edges 19, formed by making a large V-shaped cut in the rear of the brim piece, to overlap one another to form a seam. Figure 7 is drawn on a reduced scale from that of Figure 6, it being understood that the inner edge 17 of the brim piece is substantially co-extensive in length with the outer edge of the foundation piece 7. It will be noted that the sides of the foundation 7 are broadened so that the lateral edges are outwardly extended, the curve thereof being much greater than the curve of the adjacent inner edge of the brim piece to which it is secured. This forces the sides of the brim piece downwardly into a drooping position and springs the front and back of the brim piece upwardly and prevents them from drooping. It will thus appear that when the foundation piece has been secured to the oval-shaped crown piece a hat body is obtained which is of generally oval shape. The degree of droop to the sides of the brim piece and the set of the front and back is dependent upon the relative breadth of the side portions of the foundation piece and the curvature of its edge with relation to the inner edge of the brim piece. Therefore, the style of the hat may be varied at will by changing the relative proportions and curvature of these parts, it being understood that the finished hat is in all instances of generally oval shape.

When a particular hat is to be fashioned to an individual's order, the several parts are secured together in the manner just described to produce a hat frame such as is shown in Figure 9, it being understood that suitable material such as buckram is employed, which readily lends itself to such shaping. The hat frame so constructed is then covered with suitable trimming material. Obviously, where the hat is blocked into shape only a single piece of buckram is used. What I desire to chiefly point out is that by my invention I have made it possible to quickly and economically obtain a hat frame which may be immediately covered with trimming material, the hat frame so obtained being of generally enhanced shape and appearance.

Hats in vogue today are designed to be pulled over the back of the head so that the front part of the crown crushes the wearer's hair against her head and the lower edge of the crown is cut off at such angle as is required to dispose the brim as the style may dictate. The hat shown herein is adapted to be drawn over the top of the wearer's head so that ample room is provided for the wearer's hair in the interior of the front of the crown piece 6 while edge 18 of foundation piece 7 may be cut so as to produce any angle desired for brim piece 8.

It will be understood that the brim piece 8 is not always an essential element in the hat frame and that in certain instances it may be dispensed with. For instance, if I desire to construct a so-called "turban" style of hat, I employ merely the crown piece 6 and the foundation piece 7, as shown in Fig. 10. In this turban it will be observed that the foundation piece 7 is of greater depth in the rear than in the front thereof so as to adapt it to be worn at a tilt with the lower front edge raised above that of the lower rear edge. By increasing somewhat the depth of the frontal portion of the foundation piece it becomes possible to dispense with the particular crown piece 6 shown herein and in its place substitute a flat piece of material of oval shape to form a turban of more matronly appearance. It will be understood therefore that while I have described and illustrated one embodiment of my invention, various changes and modifications may be made from time to time without departing from the spirit or principles thereof, and hence I do not limit myself to the precise construction set forth, but consider that I am at liberty to make such changes and alterations as fairly come within the scope of the appended claims.

What is claimed as new and useful is:

1. A lady's hat formed of a crown piece having a depending edge, a foundation element having a central opening and a V-cut with the edges of the V-cut secured together, and a brim piece having a central opening and a V-cut with the edges of the V-cut secured together, the edge of the central opening of the foundation element being adapted to be secured to the depending edge of the crown piece, and the edge of the central opening of the brim piece being adapted to be secured to the outer edge of the foundation element, the outer edge of the foundation element as above formed having a lateral dimension greater than the normal width of the central opening of the brim piece, whereby the sides of the brim are forced downwardly into drooping position and the front and back of the brim piece sprung upwardly to prevent drooping of the said front and back, substantially as described.

2. A hat frame including a substantially oval shaped crown piece of decreasing depth from front to rear, the side edges of said crown piece being sloped outwardly and downwardly and terminating in an upwardly and rearwardly inclined plane, and a foundation piece of arcuated form, the inner edge of which is arranged for securement to the depending perimetral edge of said crown piece, said foundation piece being of greatest width in its diametrically opposed side portions so that when secured to the crown piece said side portions flare downwardly and outwardly in continuation of the slope of the side edges of the crown piece whereby to form conjointly with said crown piece a hat frame of greater depth in the frontal portion thereof than in the rear.

3. A hat frame as called for in claim 2 including as an additional element a brim piece of arcuated form, the inner edge of which is arranged for securement to the depending perimetral edge of the foundation piece, said brim piece being also of greatest width in its diametrically opposed side portions so that when secured to the foundation piece the side portions thereof will droop outwardly and downwardly to a greater extent than the front and rear portions thereof.

In testimony whereof, I have hereunto affixed my signature.

MARGARET DAVIDSON.